July 8, 1952     R. L. BRIGHAM ET AL     2,602,386
CUT FILM ADAPTER FOR SERIAL PHOTOGRAPHY
FOR PHOTOGRAPHIC CAMERAS Filed July 28, 1949     3 Sheets-Sheet 1

Roger L. Brigham
Aubrey Shelton
INVENTORS

BY *(signatures)*
Attorneys

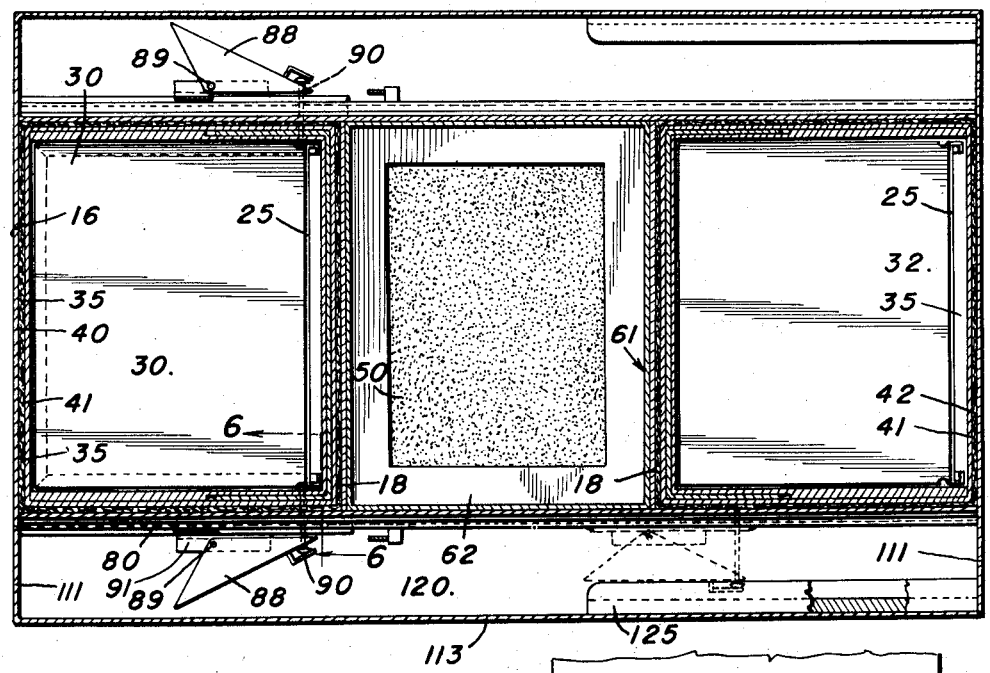

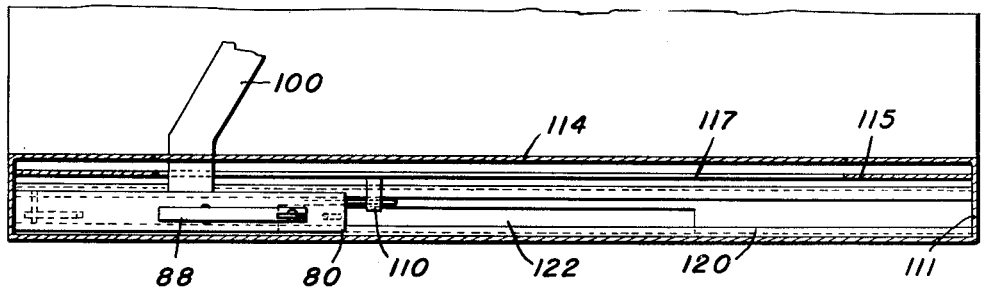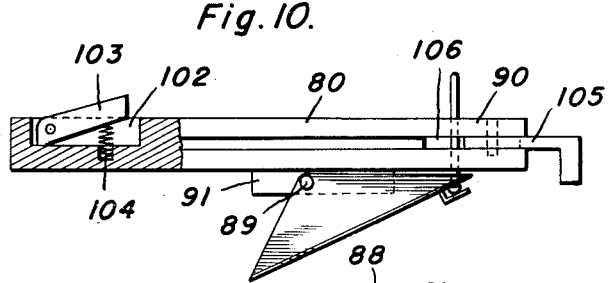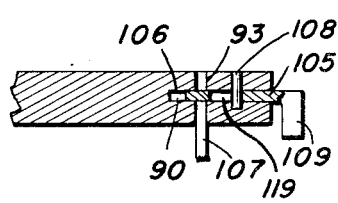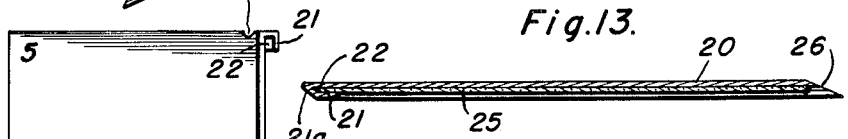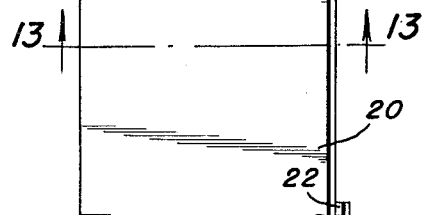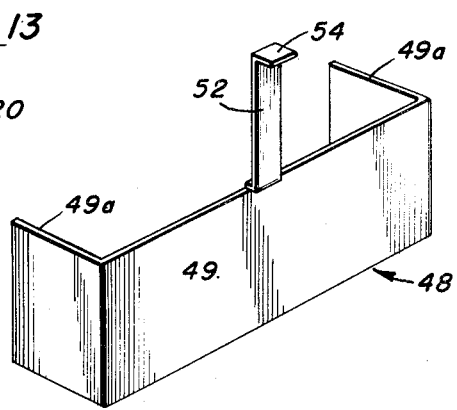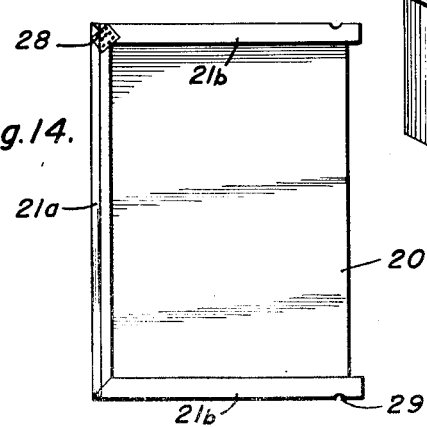

Patented July 8, 1952

2,602,386

UNITED STATES PATENT OFFICE 2,602,386

CUT FILM ADAPTER FOR SERIAL PHOTOGRAPHY FOR PHOTOGRAPHIC CAMERAS

Roger L. Brigham, Dallas, and Aubrey Shelton, Denison, Tex.

Application July 28, 1949, Serial No. 107,218

10 Claims. (Cl. 95—26)

This invention relates to adapters for film cameras and more specifically to adapters for cut films and it has for its main object to provide an adapter for serial photography which permits the elimination of the customary cut film holders, cassettes or magazines and which increases materially the number of cut films which are ready for immediate picture taking, which moreover increases the operational speed, which reduces the weight of the equipment and which simplifies the manipulation.

Cut films are regularly used, like plates, when it is necessary to first focus and inspect the picture on a ground glass, an operation which cannot be carried out with normal roll film equipment. The equipment and manipulation when cut films are used is therefore essentially identical or similar to the equipment and manipulation in the event that plates are used, insofar as a cut film holder is applied, enclosing the cut film after the ground glass has been removed and the ground glass is then replaced by the cut film holder or cassette. This manipulation makes it necessary to use lighttight cassettes for each individual cut film. Moreover this manipulation is time consuming and must be executed with care in order to avoid mistakes.

It has therefore been proposed, especially in connection with X-ray photography, to construct magazines with many cassette holders for serial photography in which a number of individually usuable cassettes holding the sensitized film is stored in a storage magazine, one of said cassettes being then shifted mechanically into a focal position and removed after exposure into a magazine where it remains until finally removed for developing. The equipment necessary for this purpose is however bulky and heavy and is therefore only suitable for stationary cameras and especially for cameras in which a double protection of the sensitized layers has to be carried out, such as protection against X-rays and the like.

It is a main object of the invention to provide an equipment for serial photography in which a large number of films may be kept in readiness for exposure, said equipment being of such a nature that it may be used in ordinary cameras.

It is a further object of the invention to provide equipment for serial photography in which the films are not enclosed individually in lighttight holders, cassettes or envelopes but are stored within a removable lighttight container without individual protection against light and in which the films are individually and mechanically moved or transferred to their exposure position, and after exposure, from this position into a container in which the exposed films are collected.

It is a further object of the invention to provide an equipment in which the lighttight containers for a plurality of exposed and unexposed films are readily removable when filled or empty and replaceable by other filled or empty containers.

It is a further object of the invention to move the film into and from the exposure position without in any way impairing or interfering with the viewing of the pictures through the ground glass, the transfer of a film to the exposure position automatically removing the ground glass from this position and the transfer of the film from the exposure position into a container for exposed films automatically bringing the ground glass back into the focal position.

It is a further object of the invention to make the ground glass movable in such a manner that it is moved behind the film to be exposed by the latter when shifted into its focal position and that it automatically takes its position again when the film is removed out of the focal position.

It is a further object of the invention to hold the cut films to be used in a large number on a protective sheet or septum which merely holds its edges while its sensitized surface is exposed, said holding sheet or septum being of such a nature that it occupies little space and may be moved by mechanical means from one place in the adapter to another.

Further objects of the invention will be apparent from the following specification.

The present invention therefore mainly consists in a camera adapter assembly, including an adapter frame carrying a removable container for unexposed films, a removable container for exposed films and a combined ground glass and exposure box, said containers and box being disposed in compartments or divisions of the adapter frames which are all in a lighttight relation so that the film without any individual protection of its sensitized surface may be moved from one of the said compartments or divisions to another.

The invention moreover consists in means for securing the lighttightness of the entire adapter assembly during the traveling of the film from one of the compartments of the assembly to the other while, at the same time, securing lighttightness during exposure of all films which are not in exposure position.

The invention moreover consists in means for mechanically and automatically shifting or transferring an individual film container for unexposed film to the focal or exposure position and from the said position to a container for exposed films, the films being held in the two said containers in a stack in a lighttight manner.

The invention moreover, as already explained, includes means for holding the film without enclosing the same, said means being sufficiently thin to allow the stacking of a large number of films in a container and said means while exposing the surface of the film nevertheless protecting the said surface against frictional contact and being also provided with means for producing the shifting and other mechanical movements of those parts which have to be displaced during the traveling of the film to the exposure position and from the latter into a container for exposed films.

The invention is illustrated in the accompanying drawings showing one embodiment of the same by way of example. It is however to be understood that the example shown in the drawings serves mainly the purpose of illustrating the principle of the invention and the best mode of applying the principle. This example therefore is not to be considered as limitative and other modes of applying the principle of the invention and modifications of the example shown are therefore not necessarily departures from the principle of the invention.

In the drawings:

Figure 4 is a sectional elevational view through the adapter, the section being taken along line 4—4 of Figure 2.

Figure 5 is a sectional elevational view of a detail, the section being taken along line 5—5 of Figure 3.

Figure 6 is a sectional elevational view of a detail, the section being taken along line 6—6 of Figure 4.

Figure 7 is a sectional elevational view through a part of the adapter as shown in Figure 6, the section being taken along line 7—7 of Figure 6.

Figure 8 is an elevational view of the side wall of one of the containers.

Figure 9 is a sectional plan view of the end wall of the container and of the gate closing the same, the section being taken along line 9—9 of Figure 8.

Figure 10 is a partly sectional elevational view of the slide.

Figure 11 is a similar sectional view of the end of the slide.

Figures 12, 13 and 14 illustrate the protective sheet or septum holding the cut film, Figures 12 and 14 being views from above and below and Figure 13 being a sectional elevational view, the section being taken along line 13—13 of Figure 12.

Figure 15 is a perspective view of the container gate.

Figure 1:
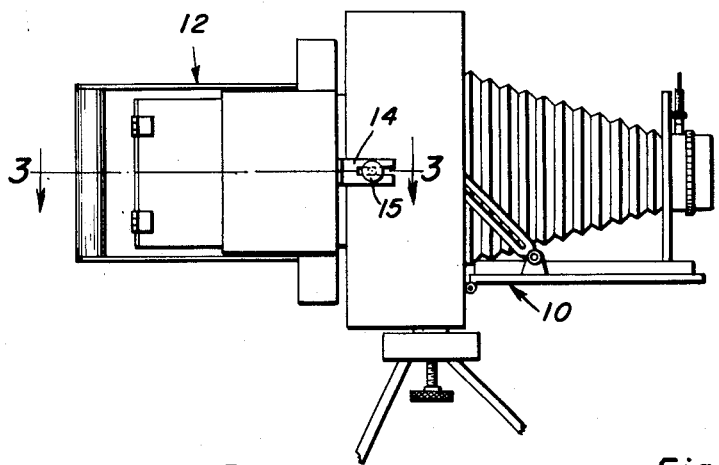
Figure 1 is an elevational side view of the camera on which the adapter according to the invention is mounted.

As shown in Figure 1 a camera 10 of any kind, whether stationary or portable may be provided with an adapter for cut films 12 which is secured on the camera by any suitable means, angle irons 14 held by screw bolts 15 being shown by way of example. Other modes for holding the adapter on the back of the camera are however usable.

The cut film adapter is constructed for the reception of cut films held on a special carrier 20 hereafter termed holder or septum and shown in detail in Figures 12 to 14. This film carrier or septum consists of a stiff and rigid metal sheet or foil with folded or turned edges 21 forming V- or U-shaped channels on three sides of the sheet or septum for receiving the edges of the cut film, the fourth side of the sheet having a straight flat edge for the insertion of the cut film. On this open side of the septum and on the side which is parallel to it the folded or overturned edges are bevelled so that inclined portions are formed. On the open side this inclined portion 26 is merely formed by cutting the channel formed by the folded edges along a plane which is inclined towards the plane of the septum or sheet 20 and on the parallel side facing the open side the folded portion 21a adjacent to sheet 20 is inclined towards the sheet so as to be undercut when the septum rests on the folded edges.

It will be noted that the inclination of the folded edges on the open side is more marked than the inclination of the folded edge portion 21a on the opposite side.

When the cut film 25 is inserted into the channels formed by the folded edges it is firmly held on three sides and is protected by and lies flat against the bottom of the septum 20 its surface being spaced from the outer surface of the next cut film septum or foil 20 by the folded edges.

The carrier or septum 20 is moreover provided on one edge with a small and thin block 28 of metal into which a character such as a letter or figure or the like has been cut or marked by means of perforations or cuts. These blocks may be arranged in one corner as shown in Figure 14. When the cut film is inserted its edges slide under the metal block and upon exposure the cuts or perforations in the block produce a photographic marking of the film with the character on the block 28. On the reverse side of the carrier or septum 20 which is completely flat the said carrier or septum is provided with a corresponding character so that the film may be identified either for the purpose of individual treatment or for the purpose of placing a legend or the like photographically on the film before development.

On the two parallel folded edges 21b a small hole or depression 29 is made in the folded portion which is at right angles with respect to the sheet or septum 20 itself for a purpose which will be described.

The adapter receiving the cut films 25 which have been inserted into their carriers or septa 20 comprises a frame 16 which is divided into box-like separate compartments by means of partition walls 18, two of said compartments receiving the two containers 30, 32 for unexposed and exposed films respectively, a third compartment receiving the ground glass and exposure box 33 which is arranged between the said two containers. The adapter is provided with slots near its bottom which are described below. It is mounted on the camera in such a way that the exposure box 33 covers the focal opening of the back of the camera.

The two containers 30, 32 are preferably identical with respect to size and construction so that they are interchangeable. In fact it is preferable to provide a certain number of containers to be used in conjunction with a single adapter unit, which containers may be filled with unexposed films and may be used one after the other. When a container is empty because all the films which have been held therein have been used it may be removed and may be used for an exposed film container. In this way the containers may permanently change their function and may alternatively be used as exposed film containers and as unexposed film containers. The emptying and filling of the containers may continue until all unexposed films have been exposed and are now stored in containers which are taken to the dark room where the exposed films are removed and are treated and unexposed films are again filled into the containers.

Each container 30, 32 consists of a lighttight box 35 with a hinged lid 36, the hinge being shown at 37, which is held by a locking means shown at 38; the lid preferably carries a closure plate 39 at its inside fitting exactly the space between the walls of the box so as to form a lighttight seal. The box fits exactly into a compartment 40, 42 of the adapter which is lined with felt 41. The dimensions of the felt lining in the drawings are of course exaggerated.

Near the bottom plate 43 of each box the latter is cut or slotted along one side (at 44) in order to permit the passage of one film carrier or septum 20. The slot extends along one side of the container and somewhat over the adjacent portion of the two side walls as shown at 47 in Figure 9. Above the slot 44 and its lateral extensions 47 the wall of the box or container 35 consists of a double wall 45, 46 with free space between the two walls. The inner wall 45 may be formed by a recess or reduced portion of the box wall and the outer wall by an outer covering piece 46 fixed at a suitable distance from the wall 45 on the box.

In the free space between the two walls 45, 46 a movable closure gate 48 is arranged which consists of a main gate wall 49 with two small lateral wings 49a at each side. An arm 52 projects in the center of the gate which is provided with a bent end piece 54 projecting outwardly from said arm and serving as a support for a small coil spring 53 which is held in a recess of the wall of the box 35. The spring holds the gate in its lower or closing position in which it completely closes the slots 44 and 47.

As the two containers are identical the container 32 is likewise provided with a double wall and closure gate on its inside which need not be described in detail.

Within the container a pressure plate 56 is loosely arranged upon which a spring 58 presses which may or may not be fixed to the lid 36. The pressure plate and spring holds the stack of film carriers or septa 20 against the bottom plate and prevents them from moving and from adopting undesirable positions.

The central compartment of the frame 16 which is located over the focal opening of the camera contains the ground glass and exposure box 33 and also a bottom plate 59 which is fixed to the adapter and which forms merely a frame surrounding a window which is coextensive with the focal opening 60 of the adapter frame and of the camera.

The ground glass box which is located in the central compartment 33 consists of two main sections. The ground glass section containing the ground glass 50 has the shape of a frame member 61 surrounding and carrying the ground glass which is somewhat smaller than the box. Therefore the box is provided with an inwardly projecting portion 62 extending toward the ground glass 50. This inwardly projecting portion 62 may be provided with flanges or ledges on which the ground glass is fixed. The outer periphery of this frame 61 is formed by the walls 63 which fit into the compartment and which are movable within the same along the compartment partition walls 18. The movable walls 63 are held and guided on the inside of the wall 65 of the fixed section of the ground glass box which are fixed to the compartment walls by means of a spacing frame 66 which is shown near the ends of the fixed section of the ground glass box and which spaces the wall 65 at the proper distance from the partition walls 18. The spacer frame 66 is also arranged at a suitable distance from the edge of the movable section so as to allow the movement of the movable section to the required extent. It will therefore be understood that the movable section 61 is held between the wall 65 and the walls 18.

Between the edges of the movable section and the fixed section small coil springs 67 are inserted which press the movable section towards the bottom plate 59 and will therefore have the tendency to hold the ground glass in the focal plane.

The movable section, in addition to the inwardly projecting wall portion 62 is also provided with inclined ledges 68 which project inwardly from the wall 63 towards and beyond the ground glass 50, and on top of the same. These inclined ledges are seated on an inclined undercut portion of the bottom wall 59 when the ground glass 50 is pressed toward the bottom wall and these ledges therefore form a seat for the movable section of the ground glass box or frame 61.

The fixed section of the ground glass box 65 is provided with a cover or lid 70 which is hinged at 72 and which may be held in place by suitable locking means 75. The lid is capable of closing the ground glass box in a lighttight manner.

The mechanism for moving the film carriers or septa 20 is illustrated in Figures 4, 5, 6, 7, 10 and 11. This mechanism comprises a slide member 80 on each side of the adapter which is provided with grooves 83 engaged by guide rails 81, 82 running along and fixed to the outer adapter walls. The guide rails may be angle irons or Z-shaped metal rails. The slide 80 carries the triangular locking or shifting pin carrier 88 which is under the influence of spring 86 holding it in a position in which one of its sides rests against the slide 80. This locking pin carrier 88 may pivot around the pivot pin 89. Near one end the locking or shifting pin carrier holds the propulsion pin 90 which projects through an opening or bore 93 and through the adapter walls in a manner described below. The triangular pin carrier 88 is pivoted to the slide in such a manner by means of a small channel 91 that one of the sides is aligned with and rests on the slide. In this position the propulsion pin 90 projects inwardly through a slot in the adapter shown at 122.

The top of the propulsion pin 90 may be held by means of a retainer shield 92 preventing the pin from sliding outwardly as a result of accidental displacement.

The slide member 80 is connected with a handle 100 which has a bent end portion at which connection is made. The handle produces a movement of the slide member along the adapter from a position close to the unexposed film container toward the position close to the exposed film container.

Each slide member is provided on its back side, turned toward the adapter, near one end with a recess 102 housing a pawl 103 pressed outwardly by means of a small spring 104. This pawl is so arranged that it is pressed inwardly by the wall of the adapter as long as the pawl moves over such a wall; but when a slot in the wall of the adapter faces the pawl 103 it will be pressed outwardly by the spring through the slot and it is then adapted to engage and to move the film carrying septa 20 which are behind the slots 122 and 47.

On the front end of the slide member 80 the propulsion pin 90 is controlled by a releasing plate 105 which is preferably held and guided within a recess or slot 106 of the slide member. Preferably the plate may be provided with an elongated slot 119 engaging a pin 108 in the slide. The control and releasing plate 105 is located close to the bore 93 through which the pin 90 passes. When pushed back the control and releasing plate 105 blocks the bore 93 and prevents the propulsion pin from passing the bore 93.

The pin controlling and releasing plate 105 is provided with an outwardly projecting bent end portion 109 which strikes against the end wall 111 of the compartment within which the slide is moving when the latter is advanced sufficiently towards the container of exposed films. A further lug 110 is provided on the other side near the container for the unexposed films against which the bent end 109 strikes when the slide is moved back to its original position, thereby pushing the control and releasing plate 105 again outwardly and through the passage through the bore 93.

The portion of the adapter which contains the slide 80 is completely enclosed within an elongated box-like structure formed by suitable walls 112, 113, 114, 111, forming a closed container the top of which is provided with a double wall, this double wall consisting of a wall 115 running in parallel to the wall 114. Each of the walls 114, 115 is provided with a longitudinal slot 116, 117 respectively for the passage of the handle 100. The two slots 116, 117 are so placed with respect to each other that the chamber which is formed between the walls 114 and 115 forms a seal for the light and any light which may have penetrated through slot 116 is prevented from penetrating further through slot 117. The end 101 of the handle 100 is therefore bent at right angle in order that it may pass through the two slots 116, 117 which are relatively displaced. The chamber 120 enclosing the slide is therefore sealed against light.

The adapter wall as already above mentioned is provided with a slot 122 which uncovers the lateral extension 47 of slot 44 of container 30 and which ends at the point to which pin 90 is moved during the advance of the slots.

The movement of the propulsion pin 90 towards the adapter containing the film carrying septa 20 and away from said adapter is produced by the tilting of the locking pin carrier 88. A cam guide 125 is arranged near one end of the chamber 120 which reaches the point where the locking or shifting pin 90 is to be withdrawn from the adapter. This cam guide 125 strikes against the inclined surface of the triangular propulsion carrier 88 and tilts the same as shown in dotted lines in Figure 4. The propulsion pin carrier then may slide along the cam guide while in a tilted position until it arrives at its outermost position.

The operation of the device will be easily understood when referring to the above description. Cut films are first placed into each carrier or septum and the unexposed films are then stacked up in the container 30 with the pressure plate 56 placed on top of the stack. The cover or lid 36 of the container has been closed, thereby tensioning the spring 58. The containers 30 and 32 are now inserted into the respective compartments of the frame 16, the container 30 being loaded, while the container 32 is empty at the start of the operation. When the containers are pushed down into their compartments so as to be firmly seated within the adapter the bent outward projection 54 of the arm 52 strikes against the upper edge of the compartment wall 18 and thereby the closure gates 48 are opened and the slots 44 are bared. When the closure gates are opened the locking or propulsion pins 90 can enter the container through the slots 47 and engage the grooves or depressions 29 in the lowermost carrier or septum 20 of the stack in the container 30.

It is to be noted that when the closure gates are opened the exposure and ground glass box still seals the openings in a lighttight manner, because the ledges of the box are firmly seated against the inclined inner sides or edges of the plate 59 which surrounds the opening or window 55 in said board through which the picture is focussed. The operator may therefore open the lid 70 disengaging the lock 75 of the ground glass box in order to focus the picture on the ground glass.

After having focussed the picture the operator closes lid 70 and locks it by means of locking member 75 and pushes handle 100 towards the center of the adapter.

During this movement of the handle 100 the slides 80 are moved along the adapter in the direction towards the container 32. The movement of the slides carries with it the propulsion pins 90 which engage the grooves or depressions 29 in the lowermost septum 20 of the stack in container 30. The advance of the slide moves the septum through the gate slot 44, the obliquely cut forward edges of the septum slide through the slot 44 and engage and lift the inclined seating edges 68 of the movable box frame 61 carrying the ground glass 50. Thereby the ground glass is lifted and the film is now in its position which corresponds to the focal position of the camera.

While the septum was moved into the focal position the end of slide 80 was moved alongside the adapter so as to face the end of slot 122. As soon as the end of the slide overruns the slot 122, the pawl 103 moves outwardly and therefore is capable of engaging the rear edge of the septum upon further advance, thus making advance of the septum by means of propulsion pin 90 unnecessary.

Figure 3:
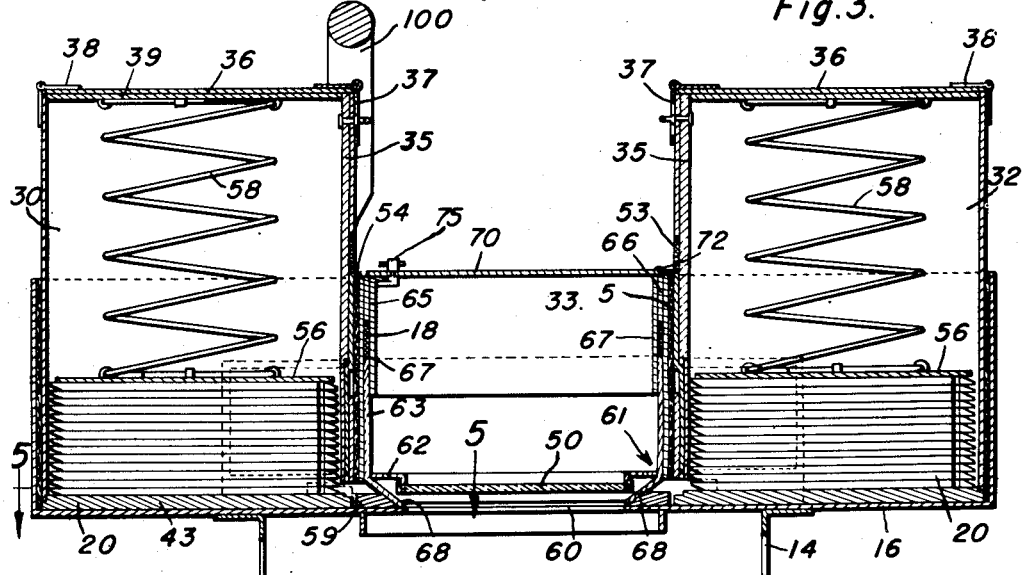
Figure 3 is a sectional plan view through the adapter, the section being taken along line 3—3 of Figure 1.
Figure 2:
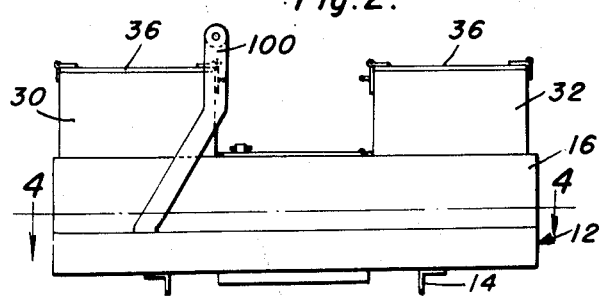
Figure 2 is a plan view of the adapter according to the invention.

The cut film in the septum which was at the bottom of the stack in container 30 is now in the right position for exposure. Exposure can therefore take place and after such exposure the handle 100 is further advanced towards the right in Figure 3 or Figure 7. The septum 20 which was in the exposure position now moves into the container 32 as the pawl 103 engages the rear edge of the septum. If the container 32 should contain stacked films pressed towards the bottom of the container by a spring the pressure of which has been properly selected, it will be seen that the obliquely cut front edges of the septum which is advanced lifts the septum at the bottom of the stack because they are pushed under the undercut and inclined rear portion of the septum in the container 32. Therefore the exposed septum containing the exposed film becomes the lowermost film of the stack while the other septa of the stack are lifted against the pressure of the spring.

The advancing slide moreover pushes the propulsion pin carrier 88 towards the cam surface 125. When this surface is reached the carrier 88 is tilted and withdraws the propulsion pin 90 so that the septum is now exclusively pushed along by the pawl 103.

When the slide 80 finally reaches the end of the compartment 120 the bent portion 109 of the control and releasing plate 105 hits the wall 111 of the chamber 120. The control and releasing plate 105 then shuts the bore 93 and the propulsion pin 90 therefore cannot interfere with the further movement or with the return movement of the parts. Moreover the propulsion pin keeps the carrier 88 in its tilted position.

The bore 93 remains shut until, upon completion of the backward stroke of the handle 100, the lug 110 is hit by the end portion 109 of the control and releasing plate upon completion of the backward stroke. The pin may then again pass through the bore 93 and permits the spring 86 to bring the carrier 88 into its normal position in which one side of the triangular carrier rests against the slide.

During the backward or return movement of the slide 80 the pawl 103 has been pressed back into the recess 102. The same operation takes place for all the film carrying septa 20 of the stack in the container 30 until container 30 has been emptied completely while container 32 now contains all the exposed films.

It will be clear that a relatively large number of films for instance thirty to forty films may be stacked up in one of the containers so that the adapter, without any change of container, is ready for a relatively large number of pictures.

It will also be clear that many constructive details herein described specifically may be changed without departing from the invention as claimed in the annexed claims.

Having described the invention, what is claimed as new is:

1. A cut film adapter unit for serial photography attachable on the outside of a conventional camera, comprising film septa for backing and holding a cut film with a sensitized layer exposed, an adapter frame holding three lighttight closed containers, arranged adjacent to each other in alignment, each of the two outermost containers forming a separate lighttight unit removable from the frame, the central container forming a focusing compartment being fixed and provided with a closable lighttight door, said adapter frame with the said containers forming a unit attachable to the outside of a camera, the two outer containers storing the unexposed and the exposed cut film septa respectively, and each of said outer containers being provided with a slot for communication with the central compartment in the side wall facing the central compartment and with lateral contiguous cuts of limited length in the two container side walls adjacent to the first named side wall, guiding means along said adapter frame, said adapter frame being provided with a longitudinal slot, a slide movable along said guiding means, a handle for moving said slide along the guide, a lighttight box structure with a double wall consisting of two spaced walls each provided with a longitudinal slot, the slots being arranged at different distances from the adapter frame wall in the walls and the end of the handle being bent so as to pass through the two slots successively, the space between the walls forming a lighttight seal, a retractible propulsion pin on said slide, adapted to project through the adapter slot and through the further lateral limited cuts in the two side walls adjacent to the cut off side wall and to engage a cut film carrier, a pivoted propulsion pin carrier on said slide, and a handle for moving the slide stepwise along the cut film.

2. A cut film adapter as claimed in claim 1, wherein the slide is provided with a slot and with a control and releasing plate held in and movable within said slot, said plate blocking the propulsion pin when in retracted position.

3. A cut film adapter as claimed in claim 1, wherein the slide is provided with a slot and with a control and releasing plate held in and movable within said slot, said plate blocking the propulsion pin when in retracted position, a head portion on said plate and stops at the end of the stroke of the slide for moving said head portion and plate at the end of the forward stroke into a blocking position and at the end of the return stroke into a releasing position.

4. A cut film adapter as claimed in claim 1 wherein the slide is provided with a recess, on its side facing the adapter, a spring pressed pawl within said recess, said pawl being pressed back by the adapter wall, during the first portion of the forward stroke of the slide, but said pawl being pressed forward so as to project through the slot of the adapter and the lateral limited side wall cuts when the slide is pushed further along the adapter, said pawl being adapted to engage and propel the cut film carriers and to push them from the exposure compartment into a container after retraction of the propulsion pin.

5. A cut film adapter unit for serial photography attachable on the outside of a conventional camera, comprising film septa for backing and holding a cut film with a sensitized layer exposed, an adapter frame holding three lighttight closed containers, arranged adjacent to each other in alignment, each of the two outermost containers forming a separate lighttight unit removable from the frame, the central container forming a focusing compartment being fixed and provided with a closable lighttight door, said adapter frame with the said containers forming a unit attachable to the outside of a camera, the two outer containers storing the unexposed and the exposed cut film septa respectively, and each of said outer containers being provided with a slot providing a communication with the central container, two movable lighttight sealing and closure means for each slot, means for opening one of said closure means when the removable container has been inserted into the frame and means for closing the slot when the removable container is removed from the frame, a movable ground glass normally located in the focal plane of the camera inserted into and shiftable within the said central container, said ground glass being connected with a second light excluding sealing and closure means for each of the slots, means for shifting the film septum at the bottom of the stack housed in the outer container for unexposed film into an exposure position in the central container, and for shifting said film septum from said exposure position in the central container into the second outer container for exposed film, means including an incline arranged transversely in the path of the film septum and operated by said film septum, when shifted, for opening the last mentioned sealing and closing means upon advance of the film septum into the central container and means for closing the last mentioned sealing and closing means of the other slot upon shifting of the film septum from the central container into the outermost container for the exposed films, said means operated by the film septum simultaneously displacing the ground glass and freeing the space above the focal plane for occupation by the cut film septum in its exposure position.

6. A cut film adapter unit for serial photography attachable on the outside of a conventional camera, comprising film septa for backing and holding a cut film with a sensitized layer exposed, an adapter frame holding three lighttight closed containers, arranged adjacent to each other in alignment, each of the two outermost containers forming a separate lighttight unit removable from the frame, the central container forming a focusing compartment being fixed and provided with a closable lighttight door, said adapter frame with the said containers forming a unit attachable to the outside of a camera, the two outer containers storing the unexposed and the exposed cut film septa respectively, and each of said containers having one of its side walls cut off at the bottom end for the passage of a single cut film carrier, two lighttight sealing and closure means for each slot, one of said closure means being held and movable on the removable container, the other being held and movable within the central container, means for holding the first-named of said sealing means normally open when the removable container has been inserted into the frame and means for closing said sealing means when the removable container is removed from the frame, a movable ground glass normally located in the focal plane of the camera inserted into and shiftable within the said central container, said sealing means held within the central container being fixedly connected with the ground glass, means for shifting the film septum at the bottom of the stack housed in the outer container for unexposed film into an exposure position in the central container, and for shifting said film septum from said exposure position in the central container into the second outer container for exposed film, and means including an incline arranged transversely in the path of the film septum operated by said film septum, when shifted, for opening the sealing and closing means held and movable within the central container upon advance of the film septum into the central container and further means for closing the last mentioned sealing and closing means upon shifting of the film septum from the central container into the outermost container for the exposed films, said means operated by the film septum simultaneously displacing the ground glass and freeing the space above the focal plane for occupation by the cut film septum in its exposure position, and means for returning the ground glass to its normal position upon shifting of the film septum from its exposure position into the outer container for exposed films.

7. A cut film adapter unit for serial photography attachable on the outside of a conventional camera, comprising film septa for backing and holding a cut film with a sensitized layer exposed, an adapter frame holding three lighttight closed containers, arranged adjacent to each other in alignment, each of the two outermost containers forming a separate lighttight unit removable from the frame, the central container forming a focusing compartment being fixed and provided with a closable lighttight door, said adapter frame with the said containers forming a unit attachable to the outside of a camera, the two other containers storing the unexposed and the exposed cut film septa respectively, and each of said outer containers being provided with a slot providing a communication with the central container, two lighttight sealing and closure means for each slot, means for holding said closure means normally open when the removable container has been inserted into the frame and means for closing said closure means when the removable container is removed from the frame, a movable ground glass normally located in the focal plane of the camera, a movable ground glass carrier adapted to move towards and away from the focal plane, said carrier being provided with two combined lighttight slot sealing means forming the second sealing and closure means for the slots leading from the outermost containers into the central container, said lighttight slot sealing means being simultaneously arranged as a lifting means moving the ground glass carrier away from the focal plane when a cut film septum is moved through the slot, means for shifting the film septum at the bottom of the stack housed in the outer container for unexposed film into an exposure position in the central container, and for shifting said film septum from said exposure position in the central container into the second outer container for exposed film, and means including an incline disposed in the path of the film septum and operated by the latter, when shifted, for opening the second sealing and closing means associated with the ground glass carrier upon advance of the film septum into the central container and for closing the last mentioned sealing and closing means of the other slot upon shifting of the film septum from the central container into the outermost container for the exposed films, said means operated by the film septum simultaneously displacing the ground glass and freeing the space above the focal plane for occupation by the cut film septum in its exposure position, and means for returning the ground glass to its normal position upon shifting of the film septum from its exposure position into the outer container for exposed films.

8. A cut film adapter unit for serial photography attachable on the outside of a conventional camera, comprising film septa for backing and holding a cut film with a sensitized layer exposed, an adapter frame holding three lighttight closed containers, arranged adjacent to each other in alignment, each of the two outermost containers forming a separate lighttight unit removable from the frame, the central container forming a focusing compartment being fixed and provided with a closable lighttight door, said adapter frame with the said containers forming a unit attachable to the outside of a camera, the two outer containers storing the unexposed and the exposed cut film septa respectively, each of said outermost containers being provided near its bottom with a cut portion running across one side wall, a double wall above said cut portion consisting of spaced walls and a movable gate held between said spaced walls and adapted to cover the cut portion and to form a lighttight seal, means to urge said gate into a position in which said cut portion is covered, an arm on said gate provided with a projecting end, compartment walls on both sides of the central focusing compartment in the adapter frame, for receiving and seating the containers between them, the projecting arm on the gate, upon seating of a container, opening the gate by its contact with one of the compartment walls, and further movable sealing and closing means located in the central container for the said cut portion, means for shifting the film septum at the bottom of the stack housed in the outer container for unexposed film into an exposure position in the central container, and for shifting said film septum from said exposure position in the central container into the second outer container for exposed film, and means including an incline disposed in the path of the film septum and operated by the latter, when shifted, for opening the last mentioned sealing and closing means upon advance of the film septum into the central container and for closing the last mentioned sealing and closing means upon shifting of the film septum from the central container into the outermost container for the exposed films.

9. A cut film adapter unit for serial photography attachable on the outside of a conventional camera, comprising film septa for backing and holding a cut film with a sensitized layer exposed, an adapter frame holding three lighttight closed containers, arranged adjacent to each other in alignment, each of the two outermost containers forming a separate lighttight unit removable from the frame, the central container forming a focusing compartment being fixed and provided with a closable lighttight door, said adapter frame with the said containers forming a unit attachable to the outside of a camera, the two outer containers storing the unexposed and the exposed cut film septa respectively, and each of said outer containers being provided with a slot providing a communication with the central container, two lighttight sealing and closure means for each slot, means for holding one of said closure means normally in an open position when the removable container has been inserted into the frame and means for closing the said closure means when the removable container is removed from the frame, a movable ground glass normally located in the focal plane of the camera inserted into and shiftable within the said central container, a movable ground glass carrier for said ground glass, spring means for urging said ground glass into a position in which it is located in the focal plane, the second lighttight sealing and closure means for the slots being attached to the ground glass carrier, said means including seating ledges inclined towards the focal plane, a seating board frame on the adapter frame, cooperating with said seating ledges on the movable ground glass carrier, means for shifting the cut film septa within the focal plane through the slots of the containers towards and from the central container, the said inclined ledges of the ground glass carrier being located in the path of the cut film septa and being lifted by said septa, thus lifting the ground glass carrier and ground glass for the passage of the cut film septum into the central container, said ground glass carrier being moved back and sealing the slot upon further movement of the cut film septum into the outer container for the exposed films.

10. A cut film adapter unit for serial photography attachable on the outside of a conventional camera, comprising film septa for backing and holding a cut film with a sensitized layer exposed, an adapter frame holding three lighttight closed containers, arranged adjacent to each other in alignment, each of the two outermost containers forming a separate lighttight unit removable from the frame, the central container forming a focusing compartment being fixed and provided with a closable lighttight door, said adapter frame with the said containers forming a unit attachable to the outside of a camera, the two outer containers storing the unexposed and the exposed cut film septa respectively, and each of said outer containers being provided with a slot for communication with the central compartment in the side wall facing the central compartment and with lateral contiguous cuts of limited length in the two container side walls adjacent to the first named side wall, guiding means along said adapter frame, said adapter frame being provided with a longitudinal slot, a slide movable along said guiding means, a handle for moving said slide along the guide, a pivotally mounted member on said slide of triangular shape, a retractible propulsion pin on said member, projecting through the slot in the adapter in one position of the pivoted member and retracted in another position, said propulsion pin being adapted to engage a cut film carrier and to shift it from a container into the exposure compartment, and a cam on said adapter, adapted to move the propulsion pin carrying member from one position in which the propulsion pin projects through the adapter slot to a position in which the propulsion pin is retracted.

ROGER L. BRIGHAM.
AUBREY SHELTON.

REFERENCES CITED

The following references are of record in the file of this patent:

UNITED STATES PATENTS

| Number | Name | Date |
|---|---|---|
| 356,941 | Hyde | Feb. 1, 1887 |
| 452,119 | Edwards | May 12, 1891 |
| 478,780 | Bristol | July 12, 1892 |
| 1,033,834 | Shukis | July 30, 1912 |
| 1,052,029 | Bander | Feb. 4, 1913 |
| 1,665,605 | Olsen | Apr. 10, 1928 |
| 2,351,877 | Rabkin | June 20, 1944 |

FOREIGN PATENTS

| Number | Country | Date |
|---|---|---|
| 247,886 | Germany | June 8, 1912 |
| 381,480 | Germany | Sept. 21, 1923 |